Dec. 12, 1967     R. D. QUINTON     3,357,413
ENGINE COOLANT TEMPERATURE STABILIZING DEVICE
Filed June 22, 1965     2 Sheets-Sheet 1

INVENTOR
REGINALD DOUGLAS QUINTON
BY
ATTORNEYS

United States Patent Office 3,357,413
Patented Dec. 12, 1967

3,357,413
ENGINE COOLANT TEMPERATURE
STABILIZING DEVICE
Reginald Douglas Quinton, Lakeside Road, P.O. Box 489,
Knowlton, Quebec, Canada
Filed June 22, 1965, Ser. No. 465,903
Claims priority, application Great Britain,
June 29, 1964, 26,871/64
13 Claims. (Cl. 123—41.05)

ABSTRACT OF THE DISCLOSURE

An internal combustion engine in which the temperature of the coolant flowing through the engine block is continuously and automatically controlled in accordance with the prevailing engine temperature thereby maintaining the operational engine temperature within a narrow range. Heat is supplied to the coolant by a source of heat which is also utilized to supply heated air free of toxic gases to the passenger space or other space on a vehicle driven by the engine.

This invention relates to devices for stabilising the operating temperature of internal combustion engine within desired limits, and in particular to devices utilising exhaust gas heat for such temperature stabilisation.

It is known that internal combustion engines should operate within fairly narrow temperature limits (of the order of 5° C.) to enable proper combustion together with minimum wear of pistons and cylinder walls to take place.

Known radiator/coolant systems, although they are effective for removing excess heat when the optimum operating temperature is exceeded, cannot add heat to the coolant when the engine is operating at temperatures below these optimum limits. This is especially true:

(a) during start-up of the engine from cold,
(b) during light or no-load running,
(c) during conditions of heat drainage by auxiliary heater systems, especially in conjunction with (a) and (b) above, and
(d) during operation at low ambient temperatures.

Although it is know to use radiator by-pass systems, variable pitch and variable clutch operated radiator fans and variable radiator shutters to assist in maintaining the engine temperature at the desired level under the above adverse conditions, these are negative rather than positive ways of dealing with the problem.

According to the present invention there is provided an internal combustion engine including a cooling jacket having an inlet and an outlet, means for returning coolant from the outlet to the inlet and a heat exchanger having a flow passage for the coolant and a flow passage for exhaust gas whereby the coolant may be heated before entry into the jacket.

According to the invention there is further provided an internal combustion engine comprising an engine block having an inlet and an outlet for coolant flow through a cooling jacket in the block, means for recirculating coolant from the outlet to the inlet, a heat exchanger having a path for receiving coolant, a path for receiving engine exhaust gas and a third path for an intermediate heat transfer fluid, the coolant path being upstream of the jacket inlet, and temperature responsive means to control operation of the heat exchanger whereby the heating of the coolant will be controlled in accordance with engine temperature.

Figure 1:
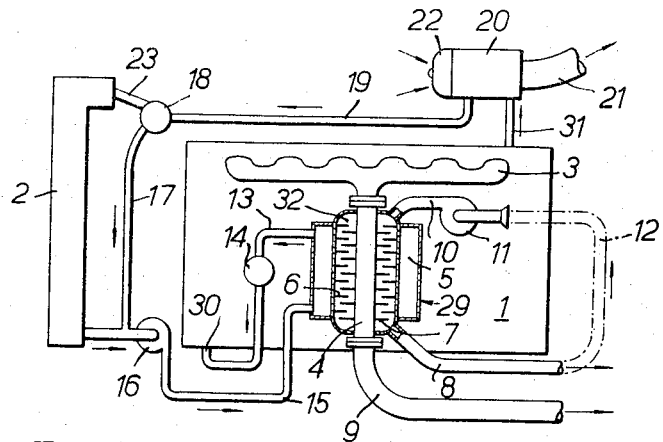
Figure 2:
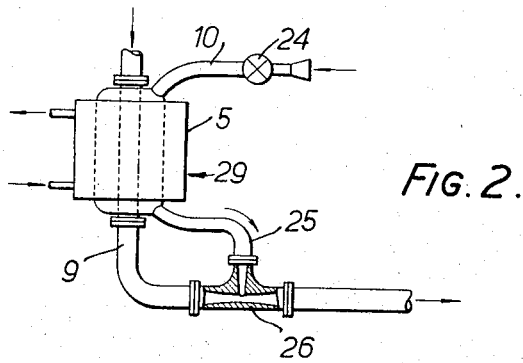
Figure 3:
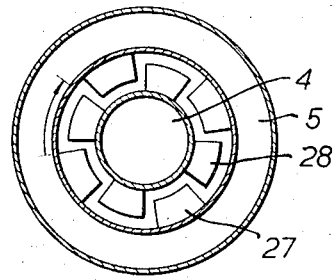
Figure 4:
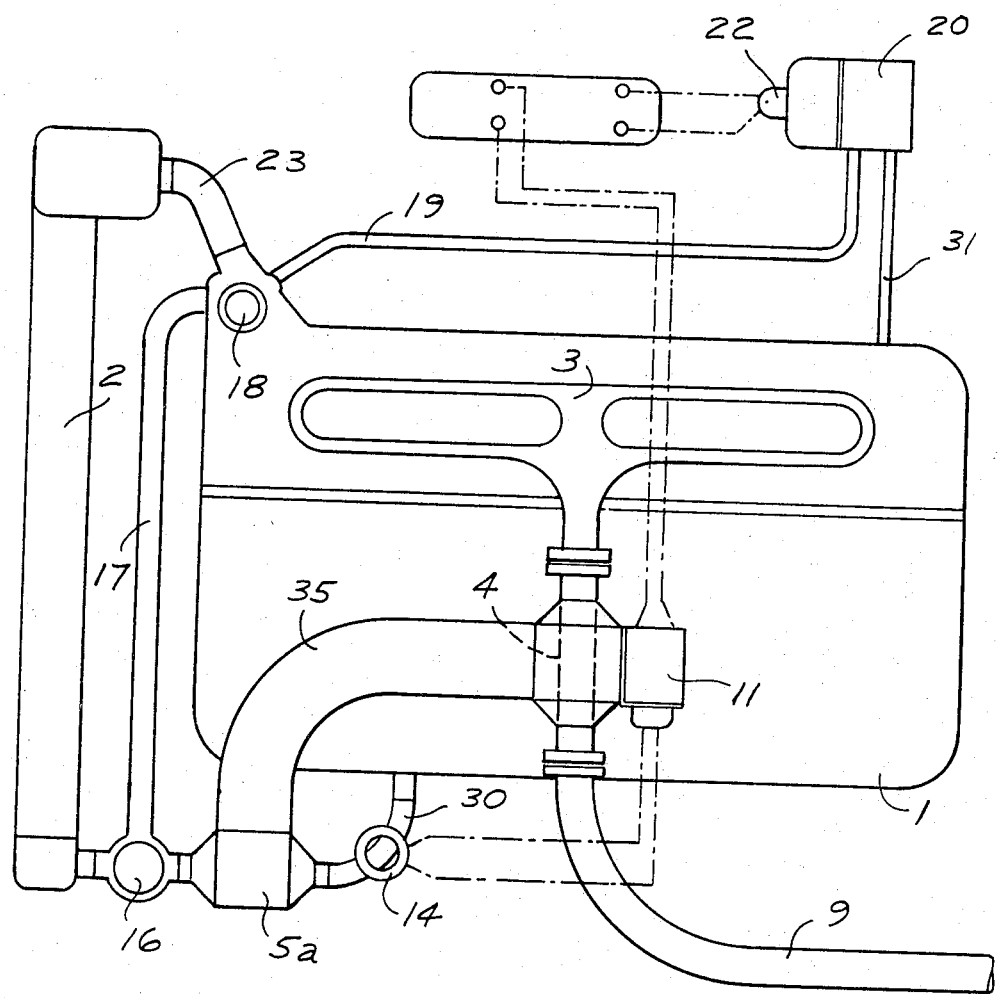

In order that the invention may be well understood there will now be described certain preferred embodiments thereof, given by way of example, with reference to the accompanying diagrammatic drawings in which:

FIGURE 1 shows an elevation, partly in cross-section, of a device according to the invention;
FIGURE 2 shows a second embodiment of a device according to the invention; and
FIGURE 3 shows a third embodiment of a device according to the invention; and
FIGURE 4 shows a fourth embodiment according to the invention.

Referring now to the drawings, an internal combustion engine has an engine block 1 and associated radiator 2. Inside the block there is the usual water coolant jacket (not shown) which the coolant can enter by the inlet 30 and leave by the pipe 31, to then pass through a coolant air heat exchanger 20 over which cabin heating/demisting air is blown by a fan 22 to pass into the cabin through a suitable duct 21.

The coolant then returns through pipe 19 to the coolant circulating pump 16 either through the radiator 2 or through the by-pass pipe 17, depending upon the setting of the thermostatically controlled by-pass valve 18. The coolant, instead of passing from the pump 16 straight back to the inlet 30, is then led through a pipe 15 to a gas/liquid heat exchanger 29 which as shown may replace a section of the exhaust pipe 9 just below, or form a part of the manifold 3. After passing through the heat exchanger the coolant is led back through a pipe 13 via the thermally responsive switch 14 (whose purpose will shortly be explained) back to the inlet 30, thus completing the coolant flow circuit.

The heat exchanger 29 comprises an an annular coolant jacket 5 through which coolant will always flow during running of the engine. The jacket 5 is concentrically spaced from and surrounds a portion 4 of the exhaust pipe which is provided with heat transfer surfaces preferably comprising a helically wound flat metal strip 7, which radially overlaps, but does not touch a correspondingly wound flat metal strip 6 provided on the wall of the jacket 5 facing the pipe 4.

Any suitable intermediate fluid which acts as a good insulator when at rest, but preferably air, may be forced through the annular space 32 between the jacket 5 and the pipe 4 by means of a suitable pump 11 driven by an electric motor (not shown). An inlet pipe 10 and an outlet pipe 8 are provided. If the intermediate fluid used is air, then the pipe 8 conveniently exhausts to atmosphere. In the case of fluids other than air it may be recirculated through the space 32, and for this purpose a return pipe 12 (shown dotted) may be provided.

The electric motor driving the pump 11 is adapted to be switched on by the switch 14 when the temperature of the coolant flowing into the engine block falls below a preset value and to be switched off by the switch 14 when the coolant temperature rises above a preset value.

When the pump 11 is switched off by the switch 14 then no fluid will be pumped through the space 32, and the coolant flowing through the jacket 5 will be effectively insulated from the hot exhaust gases passing through the pipe 4 by an insulating barrier of fluid at rest within the space 32.

Under these conditions preheating of the engine coolant will not take place.

When for any reason the coolant temperature falls below the temperature at which the contacts of the switch 14 are set to close, the motor driving the pump 11 is switched on and the intermediate fluid is forced to flow through the space 32. In so doing turbulence is caused in the fluid because of the overlapping relationship of the strips 6 and 7, which force the fluid to follow a labyrinthine path through the space 32. Under these conditions heat will readily and efficiently be transferred from the pipe 4 to the jacket 5, the intermediate fluid within the space 32 no longer behaving as an insulator but as a heat exchanger fluid.

The coolant will continue to be preheated in the heat exchanger 29 until the coolant temperature reaches a value at which the contacts of the switch 14 are set to open, thus switching off the pump 11 and restoring the intermediate fluid within the space 32 to an insulating state of rest.

This cycle will repeat itself automatically whenever necessary to keep the engine temperature within the desired optimum limits.

Alternative means for controlling the heat flow from the exhaust pipe 4 to the jacket 5 may be provided.

The continuous strips 6 and 7 may be replaced by a series of axially spaced flat radial segments 27 and 28 attached to the jacket 5 and the pipe 4 respectively. (See FIGURE 3.) In this case the pipe 4 and the jacket 5 are capable of relative rotation about their common axis through an angle sufficient to move the segments 27 and 28 from a position where they do not axially overlap to a position where they do completely overlap axially, so as to leave a number of axial passages between the axial rows of overlapping segments. This rotation may be effected by any suitable means such as a solenoid, controlled by the switch 14.

The pump 11 need not now be controlled by the switch 14, as heat transfer will only occur when the segments 27 and 28 do not axially overlap. When they are rotated by the solenoid to the axially overlapping position the intermediate fluid will be able to flow non-turbulently through the axial passages between the overlapping segments and will, even although in motion, act as an insulating barrier between the pipe 4 and the jacket 5 when preheating of the coolant is not desired.

When the intermediate fluid is air the fan 11 may be dispensed with, and (as shown in FIGURE 2) the necessary flow may be induced by a venturi section 26 inserted in the exhaust pipe 9. In this case the pump 11 is replaced by, for example, a solenoid-operated valve 24 controlled by the switch 14. The pipe 8 is replaced by a pipe 25 connected to the suction inlet of the venturi 26.

Instead of the switch 14 controlling the flow of an intermediate fluid through the space 32, it may be used to control a solenoid or the like which moves an annular shield made of any suitable heat-resistant insulating material in to or out of the space 32.

Other equivalent means of allowing or preventing heat transfer from the pipe 4 to the jacket 5 may be adopted. The jacket 5 for instance need not surround the pipe 4 but may be a separate unit. In this case the intermediate fluid will flow when desired over suitable heat transfer surface on the pipe 4 and along a suitable heat-insulated duct to the jacket 5 or its equivalent, which will again be provided with suitable heat transfer surfaces. An embodiment of this kind is schematically shown in FIG. 4. The same reference numerals are used in this figure to designate components corresponding to those in the previously described figures. Pump 11 such as an impeller or fan, sucks on cooled air and forces the same past hot pipe 4 and through an air duct 35 into a jacket 5a surrounding the inlet pipe 30 for the coolant thereby heating the coolant flowing through the pipe. The pump is turned on and off by thermostatically controlled switch 14 operated as previously described. The electrical connections for switch 14, pump 11 and fan 12 are diagrammatically indicated by dotted lines.

It will be seen that the device described above affords a positive means of maintaining the operating temperature of an internal combustion engine within narrow optimum limits even under the adverse operating conditions already enumerated. The device described is also easy to instal in existing engine and cheap to manufacture.

It will be seen that in the constructions described there is provided a heat source for cabin requirements right from start up, quick heating of the block to optimum running temperature and no risk of toxic gas reaching the cabin through the cabin air heat exchanger.

What is claimed is:

1. An internal combustion engine comprising an engine block having an inlet and an outlet for a coolant flow through a cooling jacket in the block, means for recirculating coolant from the outlet to the inlet, a heat exchanger having a first path for receiving coolant, a second path for receiving engine exhaust gas and a third path for an intermediate heat transfer fluid, the coolant path being upstream of the jacket inlet, and temperature responsive means to control operation of the heat exchanger whereby the heating of the coolant will be controlled in accordance with engine temperature.

2. An internal combustion engine according to claim 1 in which the third path includes walls having means to extend the surface of said walls exposed to flow of the intermediate fluid.

3. An internal combustion engine according to claim 2 in which a helical projecting member is provided on each wall.

4. An internal combustion engine according to claim 2 in which a plurality of projections is provided on each wall.

5. An internal combustion engine according to claim 4 in which the projections are spaced and located and the walls are angularly relatively movable so that in one position the projections on one wall are substantially in register axially with the projections on the other to define free paths for flow of the intermediate fluid while in the other position the projections together define a tortuous path for the intermediate fluid, relatively angular movement of the walls being effected by means controlled by the temperature responsive means.

6. An internal combustion engine according to claim 1 in which the third path is continuous and a pump controlled by the temperature responsive means is provided to circulate the intermediate fluid.

7. An internal combustion engine according to claim 1 in which means are provided operable by a flow of exhaust gas to induce flow of air into and through the third path.

8. An internal combustion engine according to claim 7 including a valve in the third path controlled by the temperature responsive means to interrupt the flow of the intermediate fluid.

9. An internal combustion engine according to claim 1 in which a pump is provided controlled by the temperature responsive means to control the flow of the intermediate fluid.

10. An internal combustion engine according to claim 1 in which a radiator is provided in the coolant path between the jacket outlet and the heat exchanger.

11. An internal combustion engine according to claim 10 including a radiator by-pass controlled by a temperature responsive valve.

12. An internal combustion engine according to claim 1 including a cabin air heat exchanger downstream of the jacket outlet.

13. An internal combustion engine according to claim 1, wherein said heat exchanger comprises first heat exchanger means having a flow passage for the exhaust gas and a flow passage for the intermediate fluid, a second heat exchanger means separate from said first heat exchanger means and having a flow passage for the intermediate fluid and a flow passage for said engine coolant, and duct means between said first and second heat exchanger means and connecting the flow passages for the intermediate fluid.

References Cited

UNITED STATES PATENTS 1,217,587  2/1917  Fulton.
2,266,193  12/1941  Grutzner.

RALPH D. BLAKESLEE, *Primary Examiner.*

MARK NEWMAN, *Examiner.*